United States Patent
Hunnicutt

(10) Patent No.: US 11,472,985 B1
(45) Date of Patent: Oct. 18, 2022

(54) PEEL-AWAY ADHESIVE TAPE

(71) Applicant: Deborah M. Hunnicutt, Dickinson, ND (US)

(72) Inventor: Deborah M. Hunnicutt, Dickinson, ND (US)

( * ) Notice: Subject to any disclaimer, the term of this patent is extended or adjusted under 35 U.S.C. 154(b) by 0 days.

(21) Appl. No.: 16/893,990

(22) Filed: Jun. 5, 2020

(51) Int. Cl.
*C09J 7/40* (2018.01)
*C09J 7/22* (2018.01)
*C09J 7/21* (2018.01)

(52) U.S. Cl.
CPC ............ *C09J 7/403* (2018.01); *C09J 7/21* (2018.01); *C09J 7/22* (2018.01); *C09J 7/401* (2018.01); *C09J 7/405* (2018.01); *C09J 2301/124* (2020.08); *C09J 2301/18* (2020.08); *C09J 2400/24* (2013.01); *C09J 2400/263* (2013.01); *C09J 2400/283* (2013.01); *C09J 2421/00* (2013.01); *C09J 2433/00* (2013.01); *C09J 2483/00* (2013.01); *Y10T 428/14* (2015.01); *Y10T 428/1476* (2015.01)

(58) Field of Classification Search
CPC ..... C09J 7/403; C09J 7/22; C09J 7/405; C09J 7/401; C09J 7/21; C09J 2301/124; C09J 2301/18; C09J 2400/283; C09J 2400/263; C09J 2421/00; C09J 2483/00; C09J 2433/00; C09J 2400/24; Y10T 428/14; Y10T 428/1476
See application file for complete search history.

(56) References Cited

U.S. PATENT DOCUMENTS

| | | | |
|---|---|---|---|
| 4,840,694 A | 6/1989 | Brookman et al. | |
| 5,616,387 A * | 4/1997 | Augst | A61F 13/0273 428/354 |
| 6,168,829 B1 * | 1/2001 | Russ | C09J 7/20 427/208.4 |
| 6,541,089 B1 | 4/2003 | Hamerski et al. | |
| 6,874,740 B1 | 4/2005 | Leiber et al. | |
| 7,044,561 B2 * | 5/2006 | Petchel | F16F 15/328 301/5.21 |
| 7,857,130 B2 | 12/2010 | Bartusiak | |
| 10,100,228 B2 | 10/2018 | Vemulapati et al. | |
| 10,399,376 B2 | 9/2019 | Seth | |
| 2014/0002953 A1 * | 1/2014 | Arimitsu | B32B 25/08 361/301.4 |
| 2016/0017194 A1 * | 1/2016 | Tanaka | C09J 7/20 528/302 |

(Continued)

OTHER PUBLICATIONS

Scotch Mounting Articles https://www.amazon.com/Scotch-Restickable-0-5-inch-72-Tabs-R103/dp/B004NNEI94/ref=sr_1_1?crid=17LWIM6VHS91X&keywords=72+scotch+restickable+mini+tabs+0.5+inch+clear+tabs&qid=1658436268&sprefix=72+scotch+restickable+mini+tabs+0.5+inch+clear+tabs%2Caps%2C63&sr=8-1 (Year: 2022).*

(Continued)

*Primary Examiner* — Patricia L. Nordmeyer
(74) *Attorney, Agent, or Firm* — Cramer Patent & Design, PLLC; Aaron R. Cramer

(57) ABSTRACT

Peel-away tape includes a double-sided adhesive tape with a perforated design and a peel-away backing that includes liftable tabs to assist in the removal thereof. In an exemplary embodiment, the tape and peel-away backing is perforated on equidistant intervals. A small tab located at the center of each perforation extends over the perforation line which, when separated, extends outward where it can be grasped.

10 Claims, 5 Drawing Sheets

(56) References Cited

U.S. PATENT DOCUMENTS

2018/0220871 A1* 8/2018 Suyama .................. B32B 15/08

OTHER PUBLICATIONS https://www.amazon.com/Scotch-Reusable-Mounting%20-Tab/dp/B003VNEXUG/ (Year: 2022).*

3M 667 Removeable Double-Sided Film Tape—¾×400". Product Listing [online]. Uline [retrieved on Dec. 23, 2019]. Retrieved from the Internet: <URL: https://www.uline.com/Product/Detail/S-18907/3M-Office-Tape/3M-667-Removeable-Double-Sided-Film-Tape-3-4-x-400 ?pricode=WB2230&gadtype=pla&id=S-18907&gclid=cj0KCQiAuefvBRDXARIsAFEOQ9ENj1q1JS9i11VSYSDmj7vdomaRaXk8oECxTz7U7kmY_dqMT-VhmEgaAtz8EALw_wcB&gclsrc=aw.ds>.

3M 410M Double-Sided Masking Tape—1"×36 yards. Product Listing [online]. Uline. [retrieved on Dec. 23, 2019]. Retrieved from the Internet: <URL: https://www.uline.com/Product/Detail/S-6760/3M-Double-Sided-Tape/3M-410M-Double-Sided-Masking-Tape-1-x-36-yds?pricode=WB0557&gadtype=pla&id=S-6760&gclid=Cj0KCQiAuefvBRDXARIsAFEOQ9F1OQWxr9N3FrbQNVvYWTD9-wTeul9pnB78XZeQTrMn_S1Az4WIX4aAr_dEALw_wcB&gclsrc=aw.ds>.

Adhesive Foam Mounting Squares, PK16. Product Listing [online]. © 2011-2020 Zoro Tools, Inc.. [retrieved on Dec. 23, 2019]. Retrieved from the Internet: <URL: https://www.zoro.com/scotch-adhesive-foam-mounting-squares-ok16-108/i/G4072708/>.

\* cited by examiner

PEEL-AWAY ADHESIVE TAPE

RELATED APPLICATIONS

None.

FIELD OF THE INVENTION

The presently disclosed subject matter is directed to adhesive tape and more specifically to a peel-away adhesive tape.

BACKGROUND OF THE INVENTION

Double sided adhesive tape is used in a wide variety of applications in both the do-it-yourself world as well as the Original Equipment Manufacturer (OEM) world. It solves many attachment problems that conventional fasteners such as screws, bolts, nails, and rivets cannot address. The hi-tech adhesive used with such tapes work in extreme temperatures, and even with exposure to water and other seemingly extreme chemicals.

As such tape is double-side, a removal backing layer must be used when it is initially manufactured and placed into a roll format. It is this backing that presents a big disadvantage to many users as it is very difficult to find an edge to allow it to be peeled off. In fact, the time finding an edge can occupy more installation time than measuring, cutting and applying the tape. Accordingly, there exists a need for a means by which the peel-off backing on double sided adhesive tape can be removed in an easy manner. The development of the peel-away backing for adhesive tape fulfills this need.

SUMMARY OF THE INVENTION

The principles of the present invention provide for a double-sided adhesive tape which comprises a center roll core and a tape assembly which is wound upon the center roll core. The tape assembly includes a carrier and a release liner. The double-sided adhesive tape also comprises a leading edge which is disposed on an exterior of the tape assembly. The exterior of the tape assembly includes a plurality of evenly spaced perforations. The double-sided adhesive tape also comprises a tape strip that has a plurality of tape segments which are separated from the tape assembly and a grip flag which is disposed on the release liner that does not tear along the one of the evenly spaced perforations while the carrier separates along the one of the evenly spaced perforations in a straight line.

The center roll core may be made of cardboard or plastic. The carrier may be made of polymeric film, foam, paper, cloth or foil. The release liner may be made of vinyl that may be coated with silicone release agent. Separation may be accomplished by holding a pair of adjacent tape segments and tearing along the evenly spaced perforations along a tear travel path. Tearing the evenly spaced perforations may separate both the carrier and the release liner as a continuous piece. The evenly spaced perforations may include a first group of perforations and a second group of perforations that pass all of the way through the release liner and the carrier. The evenly spaced perforations may also include a third group of perforations that are located at a middle portion of the tape segments and are in line with the grip flag.

The grip flag may be cut through the release liner, but not through the carrier. The first tape segment may be torn along the perforations and separated from the second tape segment. The grip flag may remain with the first tape segment, while the carrier is separated in a straight line along the perforations. The tape strip may be removed from the carrier and separated by tearing at the perforations and is then applied to a first surface of use. The leading grip flag on the release liner may be then gripped and lifted away along a removal travel path leaving only the carrier behind, ready to receive another object or surface to be attached. The grip flag may be easy to grasp when compared to picking at the surface of the release liner that is completely attached to the carrier.

The double-sided adhesive tape may further comprise a layer of adhesive which may be disposed on top of and bottom of the carrier. The layer of adhesive may be made of material selected from the group consisting of acrylic adhesive, rubber adhesive or silicone adhesive.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
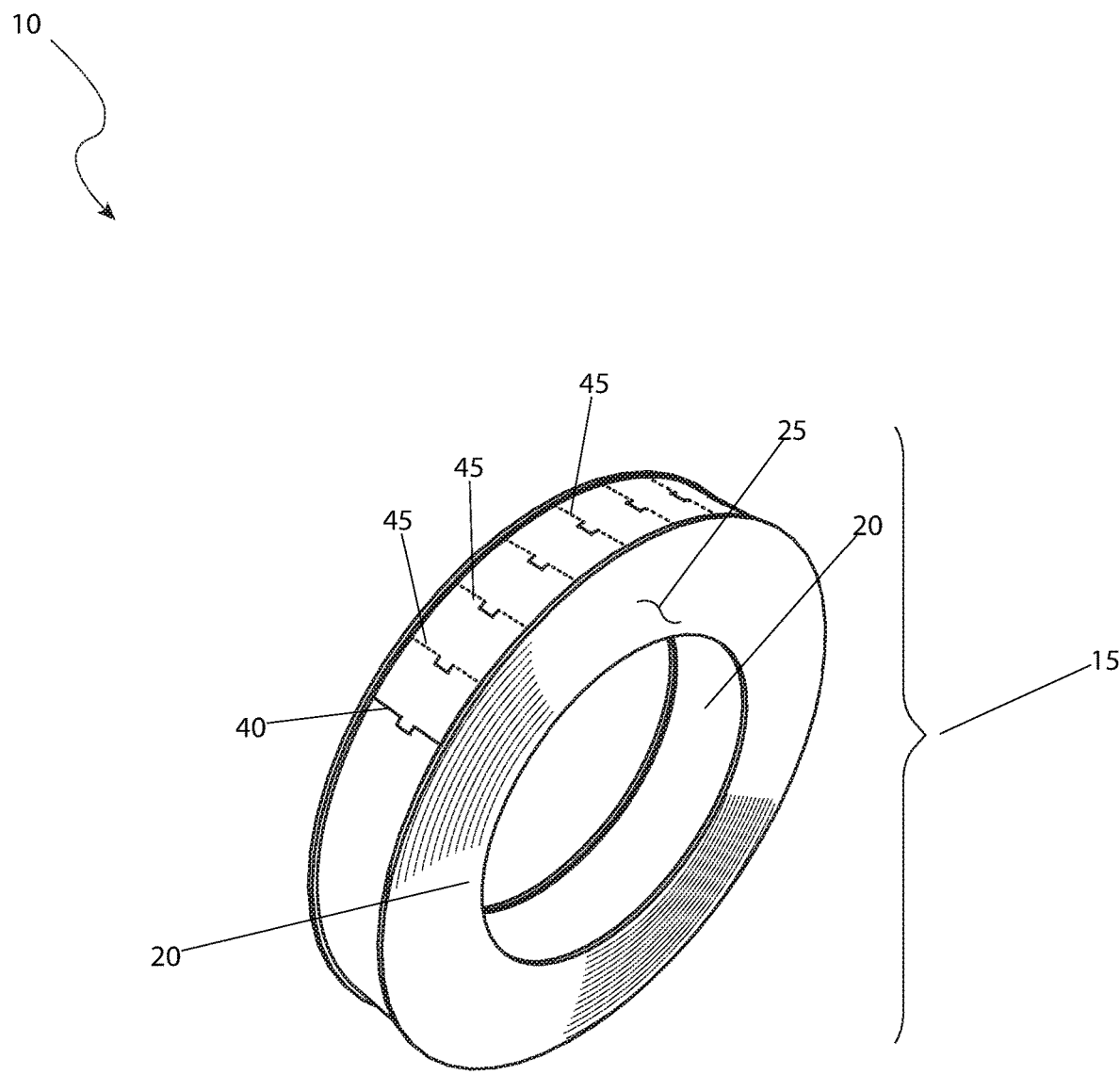
FIG. 1 is a perspective view of the double-sided adhesive tape in a rolled state, according to the preferred embodiment of the present invention.

DESCRIPTIVE KEY 10 double-sided adhesive tape
15 rolled state
20 roll core
25 tape assembly
30 carrier
35 release liner
40 leading edge
45 perforations
50 tape strip
55 tape segment
60 tear travel path "t"
65 grip flag
70 first tape segment
75 second tape segment
80 first grouping of perforations
85 second grouping of perforations
90 third grouping of perforations
95 first surface of use
100 removal travel path "r"
105 adhesive

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the double-sided adhesive tape 10 in a rolled state 15, according to the preferred embodiment of the present invention is disclosed. The double-sided adhesive tape 10 (herein also described as the "tape") 10, consists of a center roll core 20, envisioned to be made of cardboard, plastic, or similar material. A tape assembly 25 is wound upon the roll core 20 in an expected manner The tape assembly 25 is comprised of a carrier 30 (not shown in this figure, due to illustrative limitations) and a release liner 35 (not shown in this figure, due to illustrative limitations). Further detail on the carrier 30 and the release liner 35 will be provided herein below. A leading edge 40 is visible on the exterior of the tape assembly 25 along with evenly spaced perforations 45. The overall width of the tape 10 along with the quantity of the tape assembly 25 located on each roll core 20 will vary per type of tape 10 and its intended use. The exact width or length of the tape 10 is not intended to be a limiting factor of the present invention.

Figure 2:
FIG. 2 is a perspective view of the double-sided adhesive tape, in a state of being cut (torn), according to the preferred embodiment of the present invention.
Figure 2:
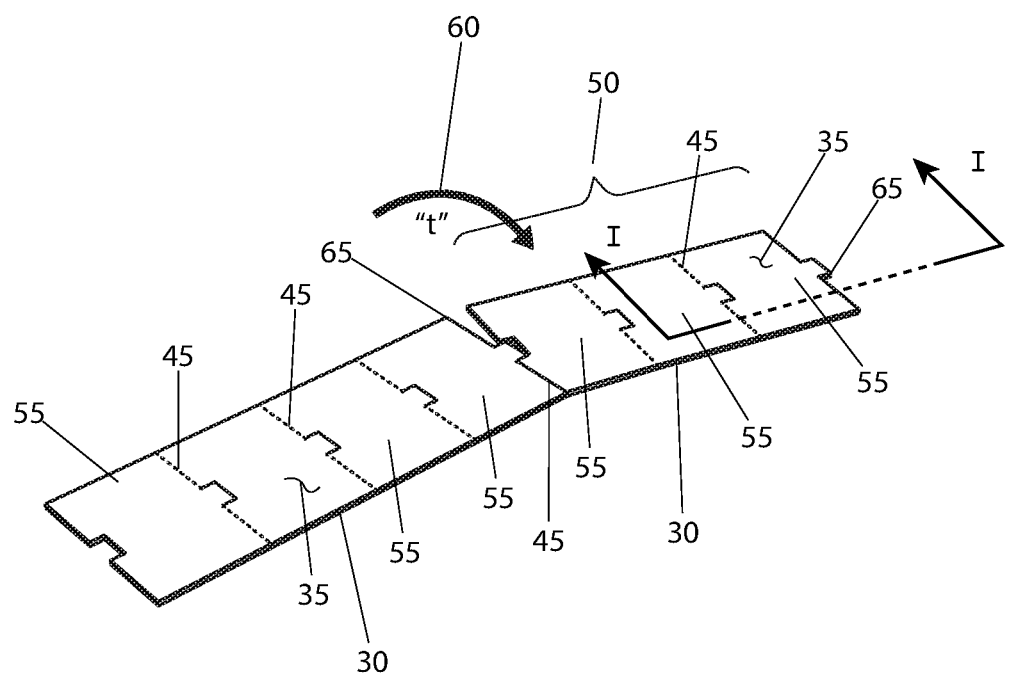

Referring next to FIG. 2, a perspective view of the tape 10, in a state of being cut (torn), according to the preferred embodiment of the present invention is depicted. A tape strip 50, consisting of three (3) tape segments 55, is shown being separated from the tape assembly 25. Such separation is accomplished by holding two (2) adjacent tape segments 55 (one per hand) and tearing along a perforation 45 in the direction of tear travel path "t" 60 as shown. Such tearing action separates both the carrier 30 and the release liner 35 as a continuous piece. It is noted that a grip flag 65, provided as part of the release liner 35 does not tear along the line of perforations 45, but instead remains attached to the adjacent segment. However, the carrier 30 does separate along the perforations 45 in a straight line. Further explanation of the functionality of the grip flag 65 will be provided herein below. It is envisioned that the carrier 30 would be manufactured of a polymeric film, foam, paper, cloth, foil, or the like. It is envisioned that the release liner 35 would be made of a vinyl material that has be coated with a silicone release agent. However, the exact materials as used with the carrier 30 and the release liner 35 are not intended to be limiting factors of the present invention.

Figure 3:
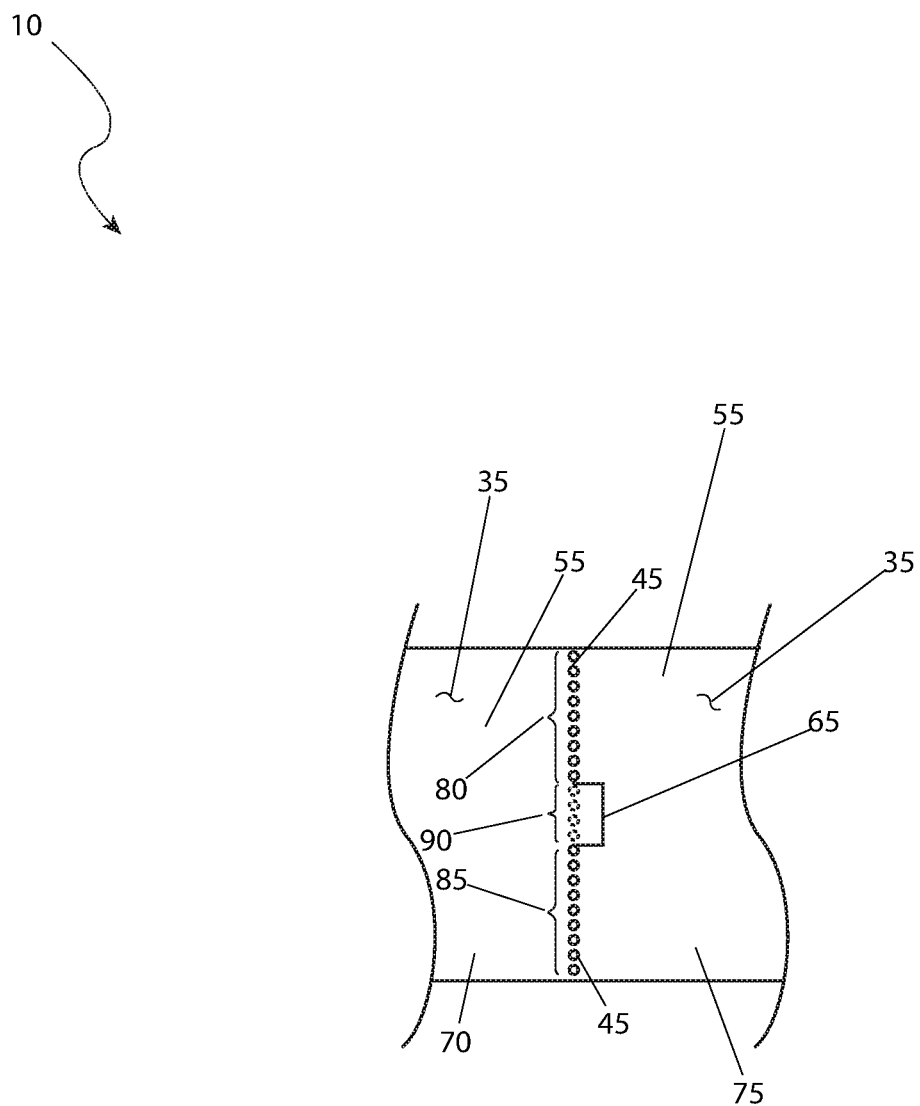
FIG. 3 is a detailed top view of the perforations as used with the double-sided adhesive tape, according to the preferred embodiment of the present invention.

Referring now to FIG. 3, a detailed top view of the perforations 45 as used with the tape 10, according to the preferred embodiment of the present invention is shown. Two (2) tape segments 55 are shown with the leftmost tape segment 55 identified as a first tape segment 70 and the rightmost tape segment 55 identified as a second tape segment 75 for purposes of descriptive clarity. A first grouping of perforations 80 and a second grouping of perforations 85 pass all of the way through the release liner 35 and the carrier 30 (not visible in this figure due to illustrative limitations). A third grouping of perforations 90, located at the middle of the tape segments 55 and in line with the grip flag 65, are only placed in the carrier 30 material and are thus shown via dashed lines, due to their hidden state. The remaining three (3) sides of the grip flag 65 are cut all the way through the release liner 35, but not through the carrier 30. Thus, as the first tape segment 70 is torn along the perforations 45 and separated from the second tape segment 75, the grip flag 65 remains with the first tape segment 70, while the carrier 30 is separated in a straight line along the perforations 45.

Figure 4:
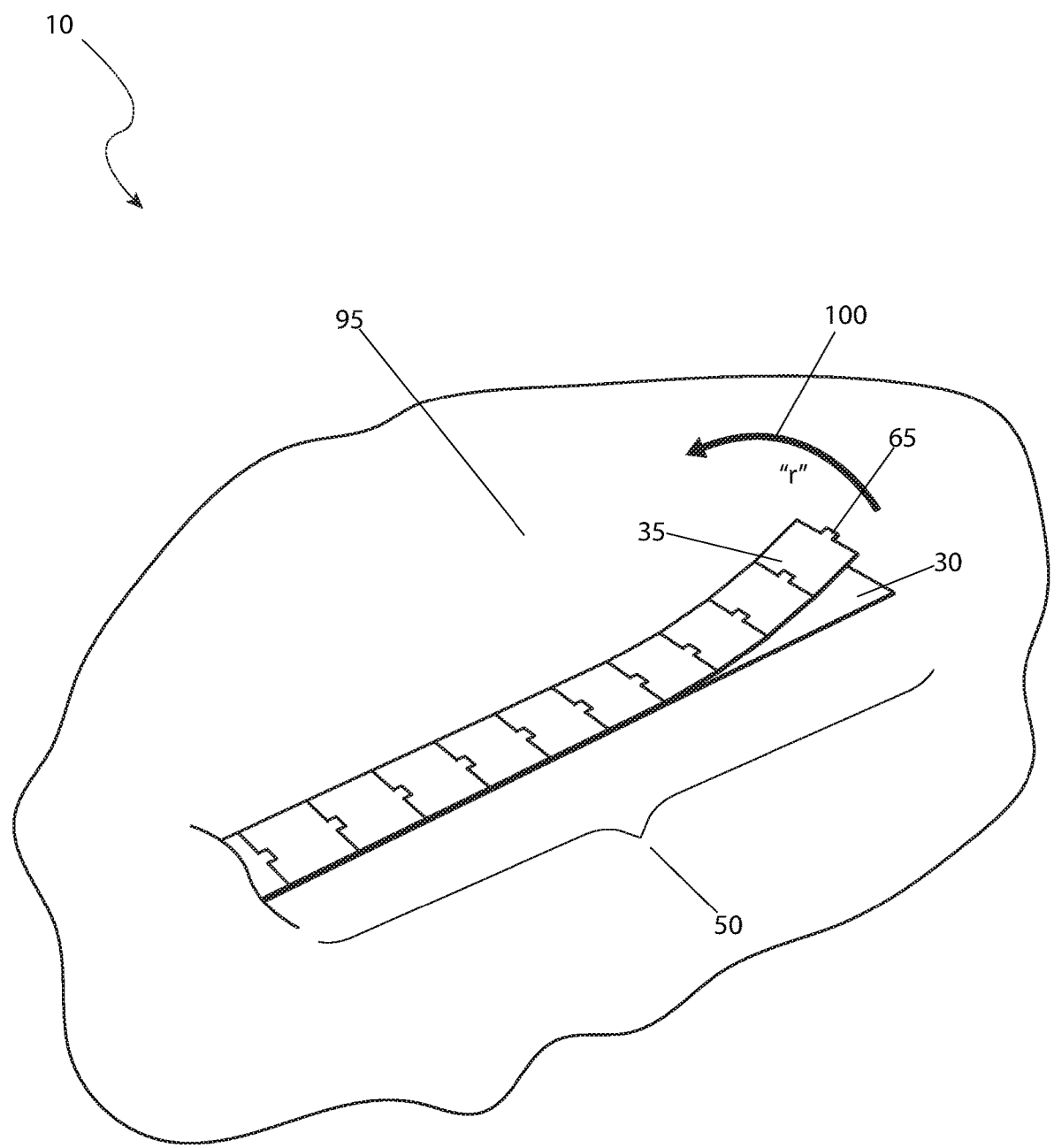
FIG. 4 is a perspective view of the double-sided adhesive tape, with the release liner in a state of being removed, according to the preferred embodiment of the present invention; and, FIG. 5 is a sectional view of the tape assembly, as seen along a line I-I, as shown in FIG. 2, according to the preferred embodiment of the present invention.

Referring next to FIG. 4, a perspective view of the double-sided adhesive tape with enhanced perforations 10, with the release liner 35 in a state of being removed, according to the preferred embodiment of the present invention is disclosed. FIG. 4 discloses a tape strip 50 consisting of five (5) tape segments 55 for purposes of illustration. The tape strip 50 has been removed from the carrier 30 (as shown in FIG. 1) and separated by tearing at the perforations 45 (as shown in FIG. 2). The tape strip 50 is then applied to a first surface of use 95 in a conventional manner. The leading grip flag 65 (at a first end of the tape strip 50) on the release liner 35 is then gripped in between one's fingers and lifted away along a removal travel path "r" 100. This action leaves only the carrier 30 behind, ready to receive another object or surface to be attached in an expected manner.

Figure 5:
Figure 5:
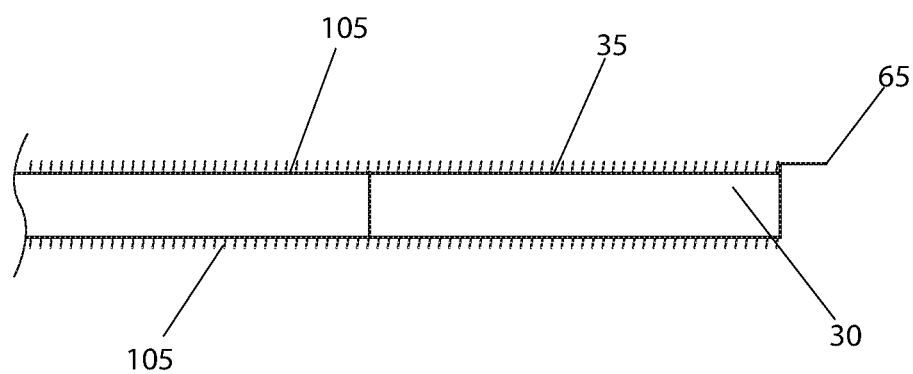

Referring to FIG. 5, a sectional view of the tape assembly 25, as seen along a line I-I, as shown in FIG. 2, according to the preferred embodiment of the present invention is depicted. This view discloses the relatively thick nature of the carrier 30 compared to the relatively thinner nature of the release liner 35. The grip flag 65 is visible at the right-hand side where upon it is easy to grasp when compared to the conventional practice of picking at the surface of the release liner 35 that is completely attached to the carrier 30. A layer of adhesive 105 is present on both the top and bottom of the carrier 30. It is envisioned that the adhesive 105 would be of an acrylic, rubber or silicone adhesive variety. It is also envisioned that the types of adhesive 105 on either side of the carrier 30 could be the same or different, with the different version commonly known as differential adhesive tape. The exact type or configuration of the adhesive 105 used with the tape 10 is not intended to be a limiting factor of the present invention.

2. Operation of the Preferred Embodiment

The preferred embodiment of the present invention can be utilized by the common user in a simple and effortless manner with little or no training. It is envisioned that the tape 10 would be constructed in general accordance with FIG. 1 through FIG. 5. The user would procure the tape 10 from conventional procurement channels such as hardware stores, home improvement stores, mechanical supply houses, mail order and internet supply houses and the like. Special attention would be paid to the material of construction, size, and adhesive 105 used with the carrier 30.

After procurement and prior to utilization, the tape 10 would be prepared in the following manner: the tape 10 is envisioned to be supplied to the final user in a rolled state 15;

the user would make preliminary estimates on the overall quantity of tape 10 needed for the project or application at hand.

During utilization of the tape 10, the following procedure would be initiated: an appropriate length of tape segments 55 would be lifted away from the rolled state 15 of the tape 10 on the roll core 20; the user would tear the desired length of tape 10 by separating a tape strip 50 at a nearest perforations 45 as shown in FIG. 2; note that it is also envisioned that the tape 10 could be cut to an exact length with a knife, scissors, or similar cutting tool should a more exact quantity (length) of tape 10 be needed; the tape strip 50 is then applied to a first surface of use 95 in a conventional manner; the user then grips the grip flag 65 in between their fingertips and pulls the release liner 35 away along the removal travel path "r" 100 and discards the removed release liner 35; and a second object or surface is then attached to the exposed adhesive 105.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A double-sided adhesive tape, consisting of:
a center roll core;
a tape assembly wound upon the center roll core, the tape assembly includes a carrier and a release liner;
a leading edge disposed on an exterior of the tape assembly, the exterior of the tape assembly includes a plurality of evenly spaced perforations;
a tape strip having a plurality of tape segments separated from the tape assembly;
a grip flag disposed on the release liner that does not tear along the evenly spaced perforations while the carrier separates along the evenly spaced perforations in a straight line; and
a layer of adhesive disposed on top of and bottom of the carrier;
wherein separation is accomplished by holding a pair of adjacent tape segments and tearing along the evenly spaced perforations along a tear travel path;
wherein tearing the evenly spaced perforations separates both the carrier and the release liner as a continuous piece;
wherein the evenly spaced perforations include a first evenly spaced group of perforations and a second evenly spaced group of perforations that pass all of the way through the release liner and the carrier;
wherein the evenly spaced perforations include a third evenly spaced group of perforations that are located at a middle portion of the tape segments and are in line with the grip flag;
wherein the grip flag is cut through the release liner, but not through the carrier;
wherein the first tape segment is torn along the evenly spaced perforations and separated from the second tape segment, the grip flag remains with the first tape segment, while the carrier is separated in a straight line along the evenly spaced perforations;
wherein the leading grip flag on the release liner is then gripped and lifted away along a removal travel path leaving only the carrier behind, ready to receive another object or surface to be attached; and
wherein the tape strip is removed from the carrier and separated by tearing at the evenly spaced perforations and is then applied to a first surface of use.

2. The double-sided adhesive tape, according to claim 1, wherein the center roll core is made of cardboard.

3. The double-sided adhesive tape, according to claim 1, wherein the center roll core is made of plastic.

4. The double-sided adhesive tape, according to claim 1, wherein the carrier is made of polymeric film.

5. The double-sided adhesive tape, according to claim 1, wherein the carrier is made of foam.

6. The double-sided adhesive tape, according to claim 1, wherein the carrier is made of paper.

7. The double-sided adhesive tape, according to claim 1, wherein the carrier is made of cloth.

8. The double-sided adhesive tape, according to claim 1, wherein the carrier is made of foil.

9. The double-sided adhesive tape, according to claim 1, wherein the release liner is made of vinyl that is coated with silicone release agent.

10. The double-sided adhesive tape, according to claim 1, wherein the layer of adhesive is made of material selected from the group consisting of acrylic adhesive, rubber adhesive or silicone adhesive.

* * * * *